Patented July 7, 1953

2,644,767

UNITED STATES PATENT OFFICE 2,644,767

CERAMIC PIGMENT AND METHOD OF MANUFACTURE OF SAME

Russell F. Duncan, Berea, Ohio, assignor to Ferro Corporation, a corporation of Ohio No Drawing. Application May 18, 1950, Serial No. 162,801

3 Claims. (Cl. 106—292)

This invention is a continuation-in-part of my co-pending application Serial Number 67,749, filed December 28, 1948, and now abandoned.

This invention relates to a pigment of the cobalt alumina type having enhanced pigmenting value.

Calcines of cobalt and alumina are well known forms of commercial blue pigment which has an improved pigmenting value.

It is of the utmost importance to note that in the pigmenting of ceramic materials, for which this invention is particularly adapted, there are two general types of pigmenting materials. First, there are vitrifiable materials, such as the glazes, for use on glass and second, there are the non-vitrifiable pigments which are made of calcination at very high temperatures. The second class of pigmenting material while not in themselves vitrifiable can be and are used to pigment vitrifiable materials.

In developing glazes for use on glass the manufacturer is confronted with the problems of melting point, gloss, chemical resistance and the proper coefficient of expansion. To meet these conditions it is necessary to put together a complex compound. Such materials as lead, boron, alumina, soda ash, potash, silica, coloring material, etc., are mixed in the proper proportions and smelted to a glassy state. The resultant glass is a very complex material which has undergone extremely complex chemical changes. While the non-vitrifiable pigmenting materials are in themselves complex chemical compounds they do not have the physical properties of glazes. It is also important to note that the non-vitrifiable pigments can be used to color glazes but in themselves cannot be used directly as glazes. These materials are prepared by intimately mixing the raw materials and then calcining at very high temperatures on the order of 2000° to 2800° F.

It is therefore a principal object of my invention to provide a composition and method of manufacture of a ceramic pigment which will result in a product of greater pigmenting value.

It is a further object of this invention to provide a ceramic pigment for coloring vitrifiable ceramic materials.

Other objects of the invention will appear as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the ways in which the principle of the invention may be employed.

Broadly stated this invention comprises a blue pigment in which the major pigmentation is provided by compounds of cobalt in combination with compounds of aluminum, calcium, zinc, or silica and in which increased pigmenting value is obtained by the addition of minor amounts of compounds of molybdenum.

While in its preferred embodiment my invention comprises the use of cobalt in combination with alumina, zinc, and silica various combinations of these elements with or without the alumina may be used. The characterizing element of the pigment of the present invention, molybdenum, has been tried in conjunction with cobalt and zinc, cobalt and calcium, cobalt and silica, and various other combinations of cobalt and the above mentioned elements; the results obtained definitely show that while each of such blues was improved by the use of molybdenum, they were still not as desirable as the blue pigments made from cobalt, alumina, zinc, silica and molybdenum.

The compounds of cobalt alumina, zinc, silica as well as the molybdenum which characterizes the improved pigment of my invention may be present in the final composition in any of the variety of forms in which elements such as those mentioned commonly occur in compositions of this character. From the standpoint of facility of manufacture, low cost of production and general superiorty of results obtained, the aforementioned elements will be present in the form which results from the calcination of the oxides of these elements. It is to be understood, however, that instead of using the oxygen bearing forms these elements may be added to the raw mix, before calcination, in the form of such compounds thereof as will, as a result of the calcination step, yield a composition comparable to that produced by the use of the oxygen bearing forms.

In preparing my improved pigment the preferred proportions used are black cobalt oxide 20–40 parts by weight, aluminum oxide 40–70 parts by weight, zinc oxide 1–5 parts by weight, silica 1–5 parts by weight and molybdenum trioxide 0.5–10 parts by weight.

As an example of a blue pigment using the preferred range, the following example is given:

| | |
|---|---|
| Black cobalt oxide | lbs. 34.1 |
| Aluminum oxide | lbs. 58.0 |
| Zinc oxide | lbs. 2.96 |
| Silica | lbs. 2.96 |
| Molybdenum trioxide | lbs. 1.98 |

This formulation was intimately wet mixed for about five hours, dried in a hot air oven, and then calcined at 2300° F. for five hours. After cooling the calcined mass was wet ball milled until the ground material passed 100% through a 325 mesh sieve. After grinding the material was dried in a hot air oven and then pulverized in a suitable pulverizer.

The finished product was a clean bright blue with an exceptionally high pigmenting value.

The product of my invention is a strong color, cheap to manufacture, has very good weathering properties and is chemically durable. Due to these properties the product of my invention has been found to be particularly desirable in the manufacture of roofing granules. The product of this invention can also be used in the pigmentation of plastics, printing inks, paint and rubber.

Other modes of applying the principle of the invention may be employed, change being made as regards the details described, provided the features stated in any of the following claims, or the equivalent of such, be employed.

I, therefore, particularly point out and distinctly claim as my invention:

1. The process of making a ceramic pigment which comprises intimately mixing black cobalt oxide from 20–40 parts by weight, aluminum oxide from 40–70 parts by weight, zinc oxide 1–5 parts by weight, silica 1–5 parts by weight and molybdenum trioxide 0.5–10 parts by weight, calcining the mixture in a furnace at a temperature of 2000–2350° F., for about 5–6 hours, wet milling the resultant cooled calcined mass, drying and then pulverizing in a suitable pulverizer.

2. The process of making a blue ceramic pigment which comprises intimately mixing 34.1 lbs. of black cobalt oxide, 58.0 lbs. of aluminum oxide, 2.96 lbs. of zinc oxide, 2.96 lbs. of silica and 1.98 lbs. of molybdenum trioxide, calcining the mixture at a temperature of about 2000–2350° F. for about 5–6 hours and grinding the resultant product for addition of roofing granules.

3. A calcined blue ceramic pigment as produced by the process of claim 1.

RUSSELL F. DUNCAN.

References Cited in the file of this patent

"Vitrifiable Colors for Decorating Glassware," Dougherty Journal American Society, vol. 17, June 1934, page 179.

Hackh's Chemical Dictionary, Ingo W. D. Hackh and Julius Grant, second edition, P. Blakiston's and Co. Inc., Philadelphia, Pa., 1937, col. 2, page 602.

"Uses and Application of Chemicals and Related Materials," Gregory, vol. 1, Reinhold Publishing Corp., New York, 1939, page 393.